March 8, 1966 W. W. HERDERHORST ETAL 3,238,815
RATIO SELECTING APPARATUS FOR A COMPOUND SPEED VARIATOR
Filed May 21, 1962 9 Sheets-Sheet 1

INVENTORS
WILFRED W. HERDERHORST
& EDMUND W. E. KAMM
BY: Edmund W. E. Kamm
ATTORNEY

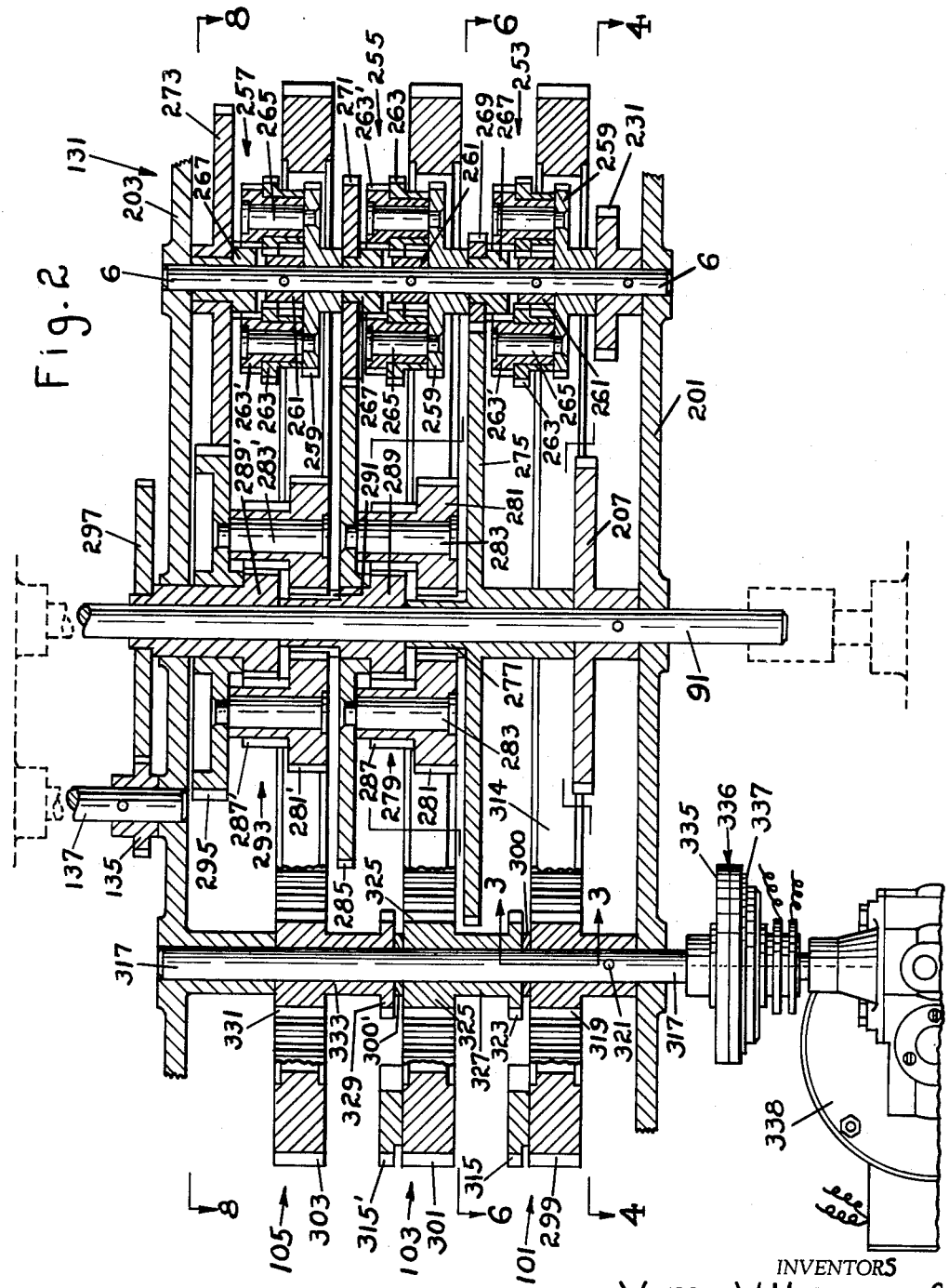

March 8, 1966 W. W. HERDERHORST ETAL 3,238,815
RATIO SELECTING APPARATUS FOR A COMPOUND SPEED VARIATOR
Filed May 21, 1962 9 Sheets-Sheet 3
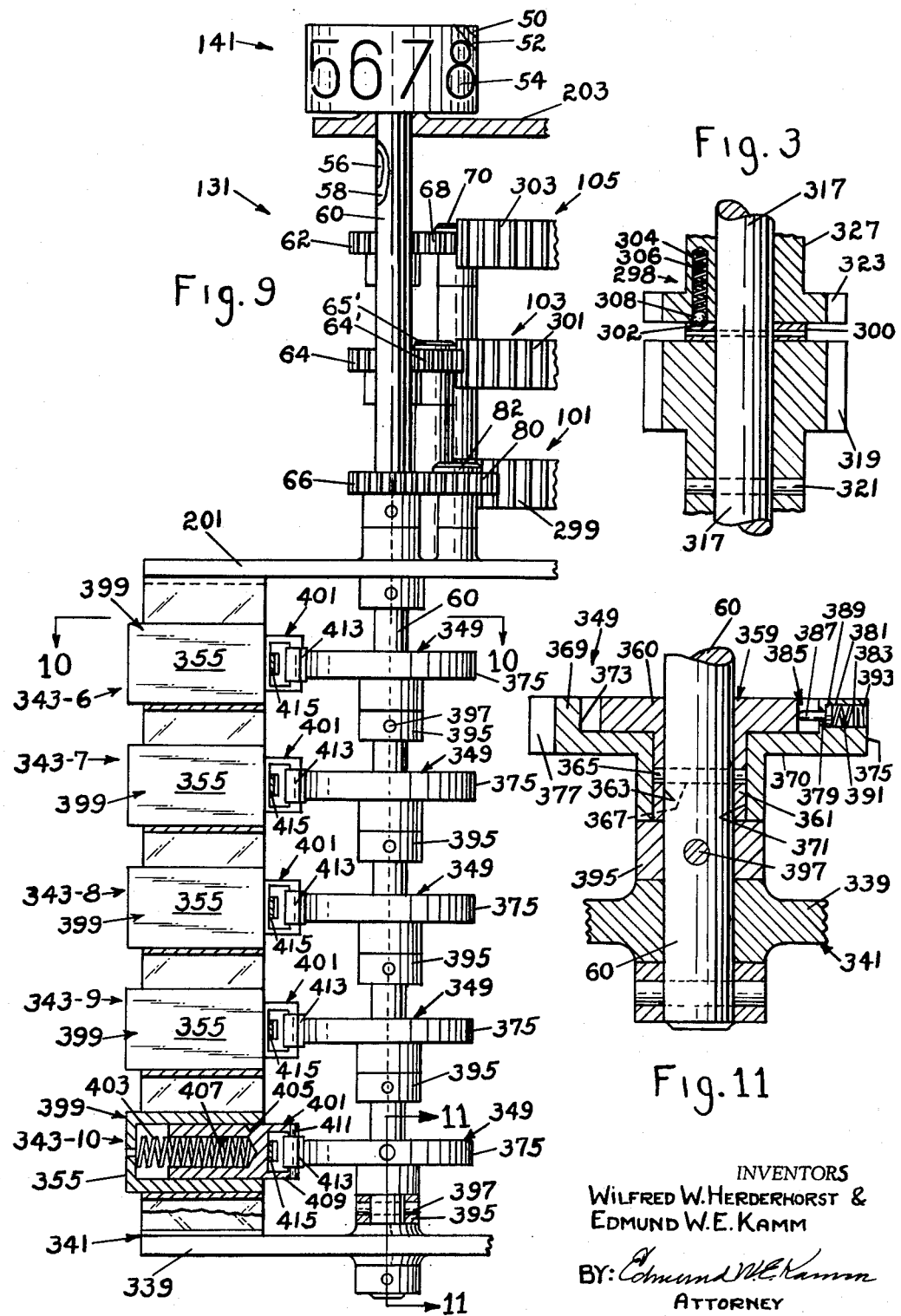
INVENTORS
WILFRED W. HERDERHORST &
EDMUND W.E. KAMM
BY: *Edmund W.E. Kamm*
ATTORNEY

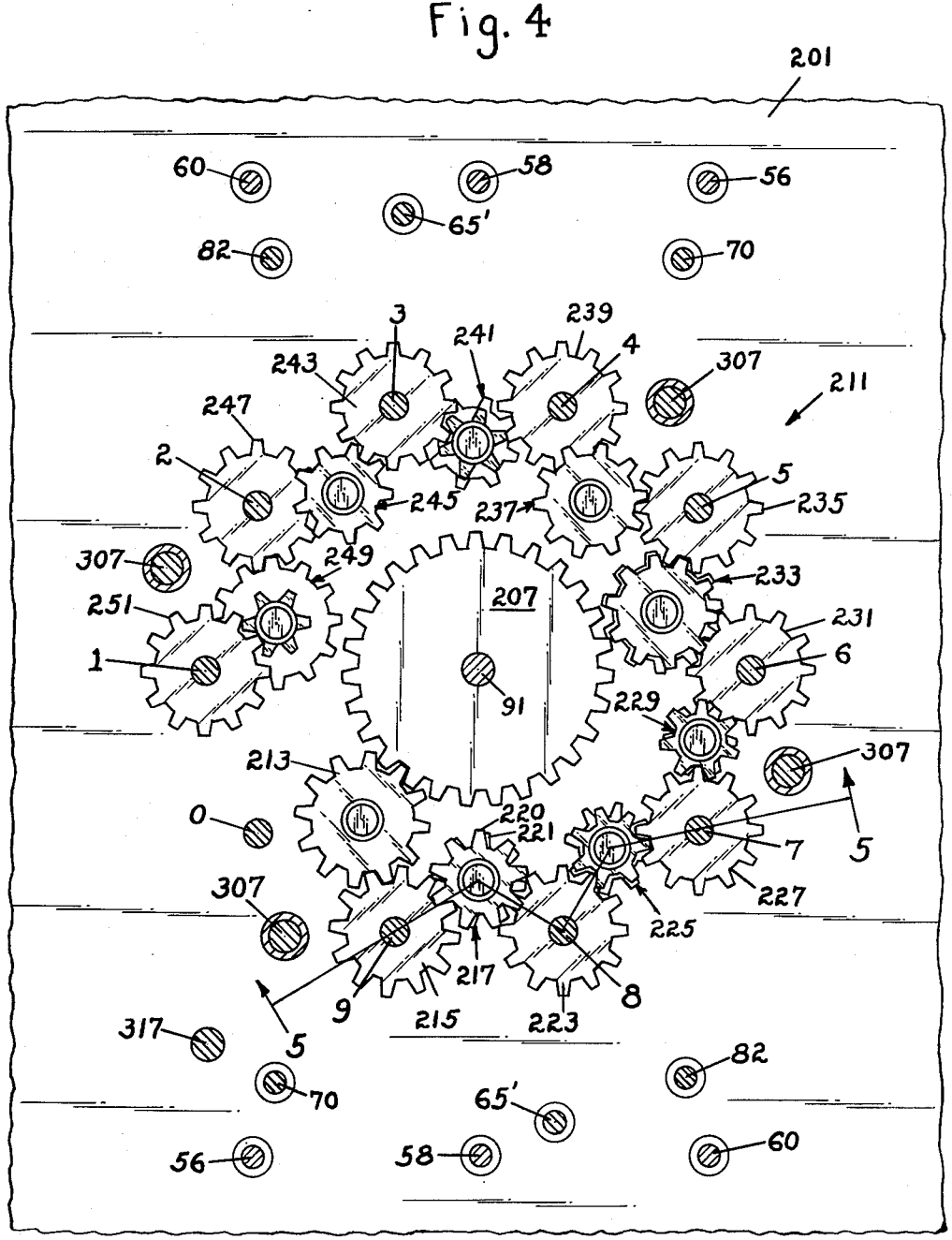

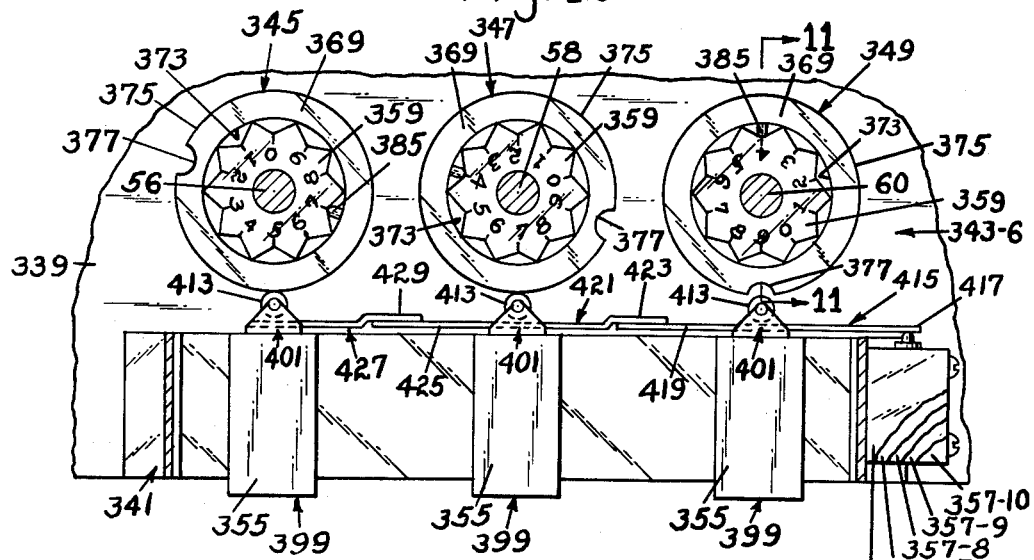
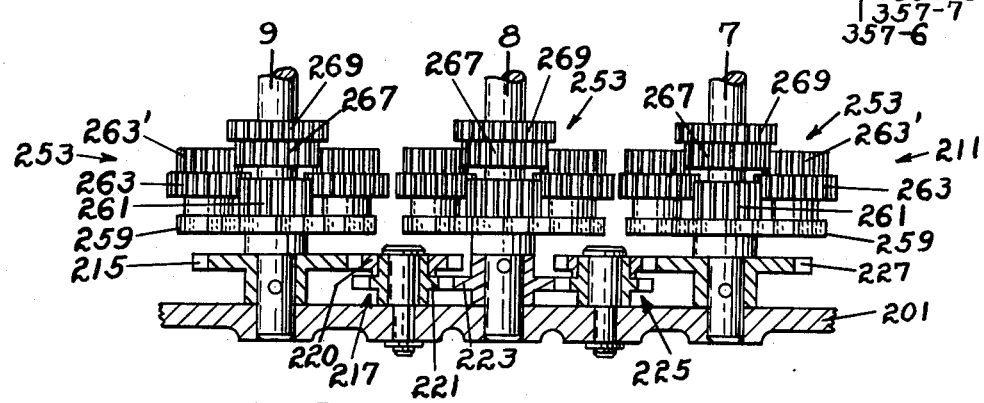
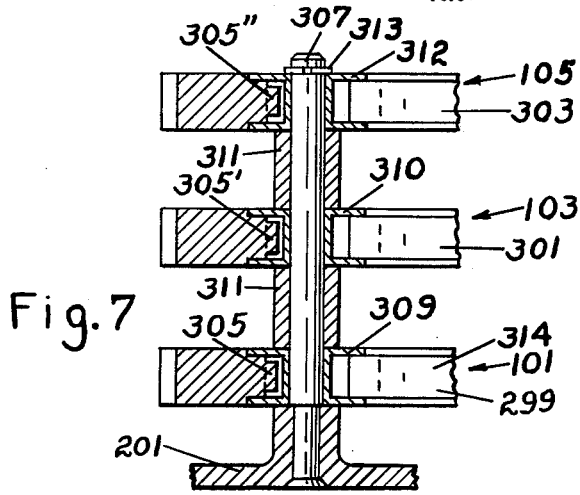

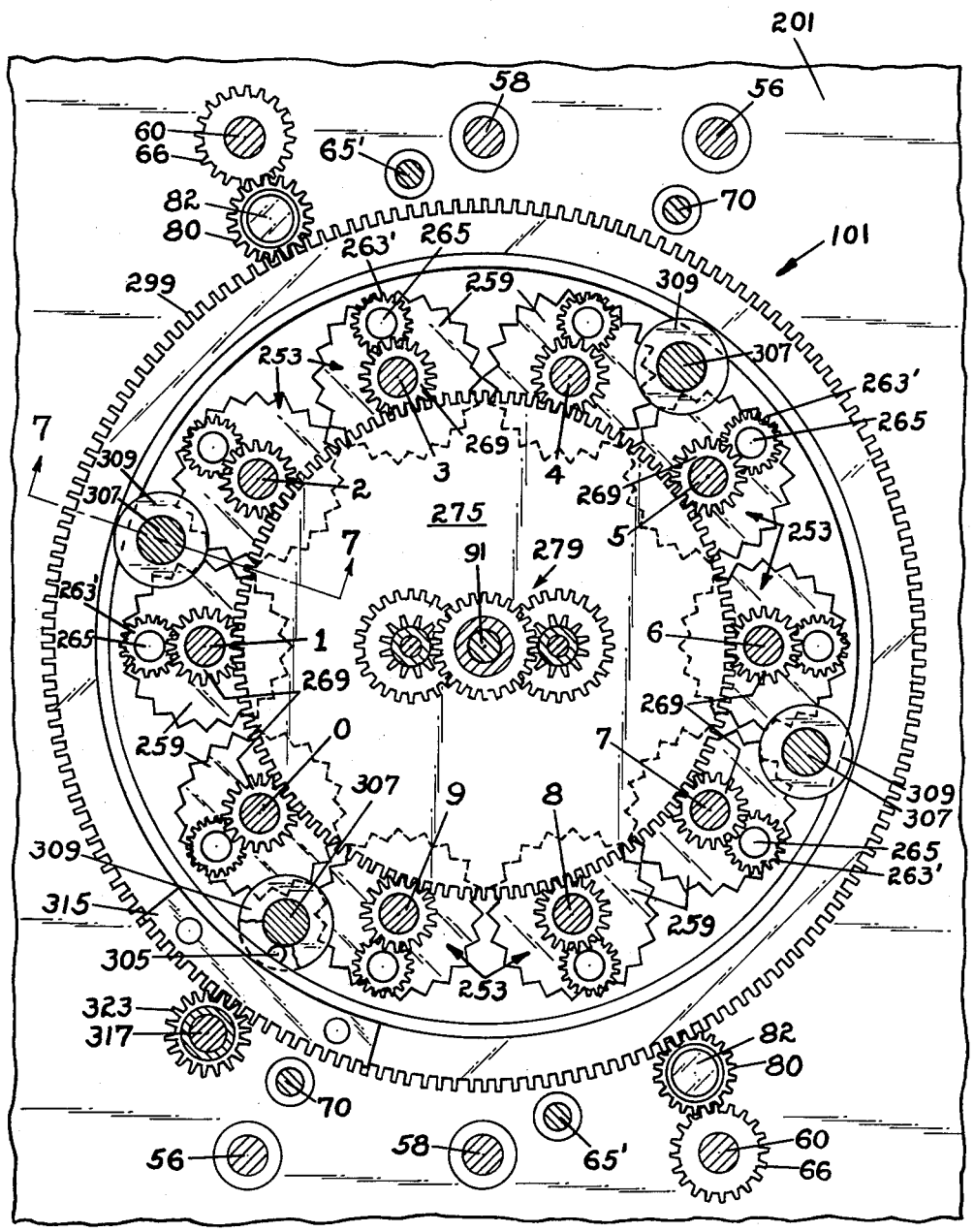

March 8, 1966 W. W. HERDERHORST ETAL 3,238,815
RATIO SELECTING APPARATUS FOR A COMPOUND SPEED VARIATOR
Filed May 21, 1962 9 Sheets-Sheet 7

INVENTORS
WILFRED W. HERDERHORST &
EDMUND W.E. KAMM
BY: Edmund W.E. Kamm
ATTORNEY

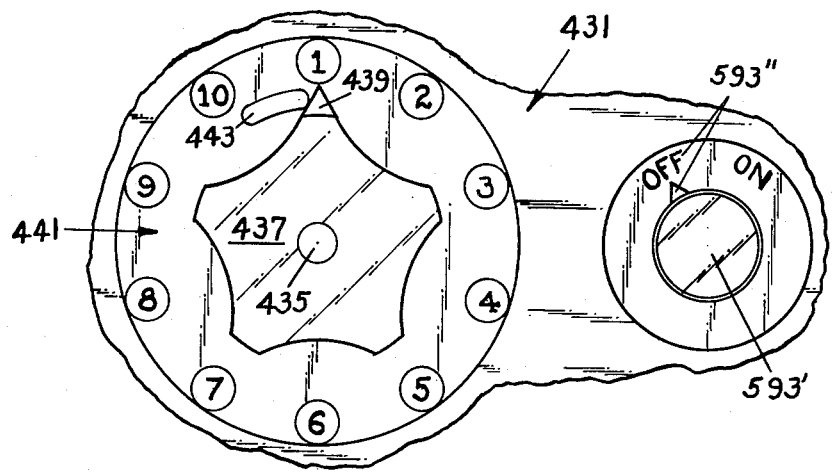
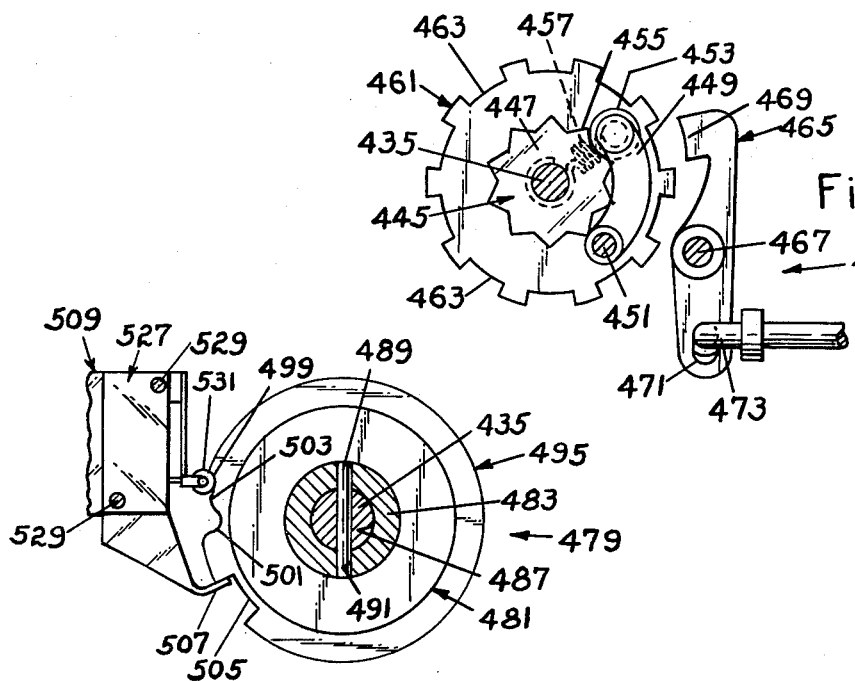
INVENTORS
WILFRED W. HERDERHORST &
EDMUND W. E. KAMM
BY: Edmund W.E. Kamm
ATTORNEY March 8, 1966 W. W. HERDERHORST ETAL 3,238,815
RATIO SELECTING APPARATUS FOR A COMPOUND SPEED VARIATOR
Filed May 21, 1962 9 Sheets-Sheet 9

INVENTORS
WILFRED W. HERDERHORST &
EDMUND W. E. KAMM
BY: Edmund W. E. Kamm
ATTORNEY

United States Patent Office 3,238,815
Patented Mar. 8, 1966

3,238,815
RATIO SELECTING APPARATUS FOR A COMPOUND SPEED VARIATOR
Wilfred W. Herderhorst and Edmund W. E. Kamm, Fort Wayne, Ind., assignors to Tokheim Corporation, Fort Wayne, Ind., a corporation of Indiana
Filed May 21, 1962, Ser. No. 196,266
25 Claims. (Cl. 74—681)

This invention relates to a compound speed variator which can be selectively set to any one of a number of ratios by power means operating under the control of a stop mechanism. More specifically the invention comprises a plurality of ratio predeterminers which can be preset for any one of a number of different ratios, together with selecting means for rendering any one of said predeterminers effective to actuate the stop mechanism when the variator is set to the ratio preset on the selected predeterminer.

The compound speed variator shown and described herein is disclosed in the U.S. Patent application 121,548, Apparatus for Dispensing and Pricing Selected Blends of Two Liquids, filed on July 3, 1961, by Robert J. Jauch et al., now Patent No. 3,152,724, issued October 13, 1964.

As disclosed in the patent application by Jauch et al., two of the compound speed variators are used in a null balance system to proportion the blend of the product and another variator is used to compute the cost of the product as it is delivered.

The compound speed variator of the application mentioned is comprised of three separate variators, and, due to the gearing to and the nature of the register driven by the compound variator, the lowest order variator is a tenths variator, the next order variator is a units variator and the highest order variator is a tens variator. Fundamentally, the compound variator provides 1,000 speed ratios which are spaced by intervals of one.

The ratio selecting apparatus disclosed herein provides for setting the compound variator to multiply the input by any one of ten preset speed changes selected from the 1,000 ratios available in the variator.

For applications or uses other than the automotive filling station dispenser disclosed in the Jauch application, the variator may be further compounded by adding one or more separate variators to increase the number of decimal orders beyond the three mentioned and proportionately expanding the ratio selecting apparatus with the compounding of additional variators. In addition, the number of predeterminers provided can be expanded to any number within the full incremental range of the compounded variator if necessary or desirable, as will be disclosed hereinafter.

It is therefore an object of this invention to provide apparatus for setting a compound speed variator to multiply the input speed by any one of a number of preset speed ratios.

It is another object of this invention to provide a predeterminer apparatus for a compound speed variator which is presettable to select any ratio within the full range of the variator.

It is another object of this invention to provide a predeterminer which can be constructed to control any number of decimal orders included in a compound speed variator and which are combined in numbers to match the number of ratios of the variator which are to be available for automatic selection.

It is another object of this invention to provide a ratio predeterminer for a speed variator which can be rendered effective from a point remote from the variator.

These and other objects of this invention will become apparent from a study of this specification and the drawings which are attached hereto, made a part hereof and in which:

FIGURE 2 is an elevation of a compound speed variator with parts in section and showing the ratio changing motor.

FIGURE 3 is an enlarged sectional view of a portion of the transfer mechanism taken on the line 3—3 of FIGURE 2.

FIGURE 4 is a section taken on the line 4—4 of FIGURE 2 showing the gear train for driving the variator.

FIGURE 5 is an elevation of a portion of the gear train for driving the variator and is taken on the line 5—5 of FIGURE 4.

FIGURE 6 is a section taken on the line 6—6 of FIGURE 2 showing one speed change mechanism or variator of the compound variator and a portion of the transfer apparatus for causing one speed change mechanism to move an adjacent speed change mechanism stepwise.

FIGURE 7 is a sectional view taken on the line 7—7 of FIGURE 6 showing the roller support means for the ring gear of each speed change mechanism and the carrier locking lugs of such gears.

FIGURE 9 is an elevation showing a drive connection between the predeterminers and the ring gears of the various variators.

FIGURE 10 is a section taken on the line 10—10 of FIGURE 9 showing one of the predeterminers.

FIGURE 11 is a section of a predeterminer presetting cam taken on the line 11—11 of FIGURE 10.

FIGURE 12A is an elevation of the ratio selector knob and dial.

FIGURE 13 is a section taken on the line 13—13 of FIGURE 12 showing the centering and latching portion of the latching mechanism.

FIGURE 14 is a section taken on the line 14—14 of FIGURE 12 showing the apparatus for initiating movement of the ratio setting mechanism in the direction corresponding to the rotation of the selector knob.

COMPOUND SPEED VARIATOR

Figure 1:
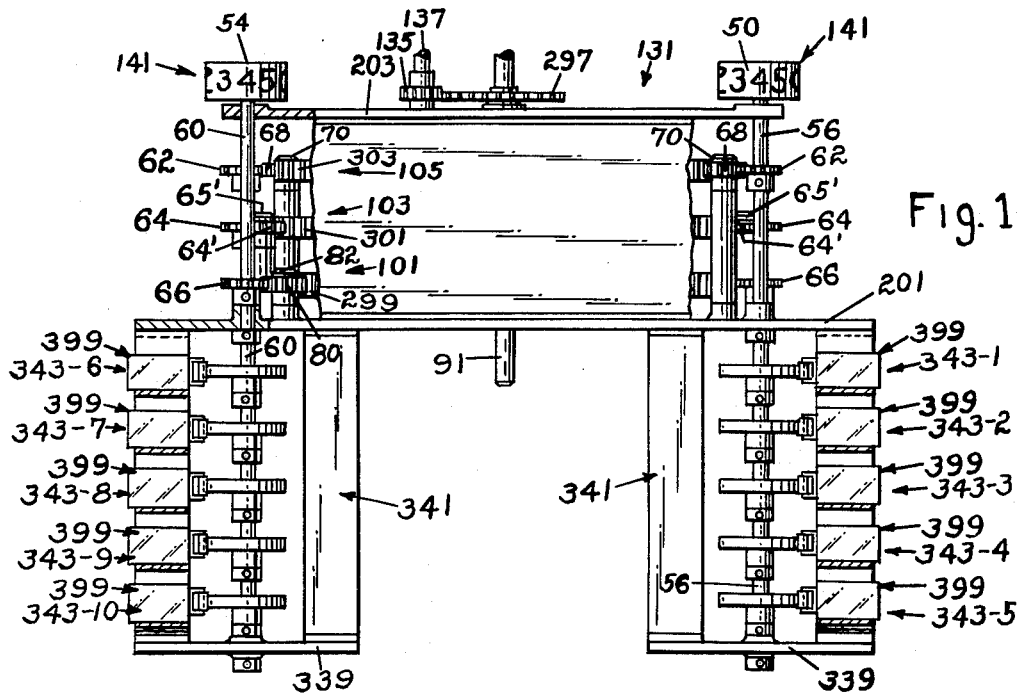
FIGURE 1 is an elevation of a compound speed variator and a plurality of predeterminers therefor.

The compound speed variator, shown in FIGURES 1 to 8 inclusive, is the same as the cost variator disclosed in the U.S. patent application by Jauch et al., which is fully identified above. The reference numbers identifying the various components in that application are retained in the following specification.

It should be understood that one of the major features of the variator 131 is that the setting of the ratio throughout the entire range of the variator speeds can be accomplished by a simple rotary motion. Further, the ratio is established by positive gearing which is continuously engaged so that there can be no error in the operation of the variator at any time. In addition, the ratio of the variator may be changed without having to move any of the parts thereof to a predetermined home position prior to changing the ratio.

The compound speed variator 131 as shown in FIGURES 2 through 8 and particularly in FIGURE 2, comprises three separate variators or speed variating means which include a tenths speed change mechanism 101, a units speed change mechanism 103 and a tens speed change mechanism 105.

Upper and lower bearing plates 203 and 201 are held in spaced relation by suitable spacer rods (not shown). The input shaft 91 for the variator 131 passes through both bearing plates and a spur gear 207 (FIGURES 2 and 4) is fastened to the input shaft at a point just inside the lower bearing plate 201. Ten spindles, respectively designated by the numerals 9, 8, 7, 6, 5, 4, 3, 2, 1 and 0 are journalled at opposite ends in the bearing plates and are spaced by intervals at 36° on a circle which is concentric with the axis of the input shaft. The spindles 9 through 1 are connected with the drive gear 207 by spur gear trains, indicated generally by numeral 211 (FIGURES 4 and 5). Spindle 0 is fixed and cannot rotate.

The gearing between the successive spindles is such that each time spindle 9 makes nine revolutions, spindle 8 will make eight, spindle 7 will make seven and so on. Thus the speeds of the respective spindles are always functions of numerical factors from 9 to 0 which is an arithmetic series or progression having an interval of unity.

It is of course necessary to properly relate the speeds of these spindles to whatever mechanism is driving the shaft 91, taking into account the particular spindle which is the first to be driven from the shaft, the units in which the driving mechanism movement is measured and the number of revolutions made by shaft 91 for each unit of movement of said mechanism.

To express these relations, let the expression $XR/U$ be the revolutions of shaft 91 for each unit of movement of the mechanism and let $n$ be the number of the spindle which is first driven from shaft 91. Then obviously, the gearing connecting shaft 91 to spindle $n$ must be $n/X$ so that the spindle speed will be $XR/U \times n/X$ or $NR/U$.

While the mechanism used to drive the spindle may be any device, the output of which can be reduced to a predetermined shaft rotation per unit, the mechanism in the Jauch application is a liquid meter which produces four revolutions of shaft 91 for each gallon of liquid passing through the meter. Also the spindle numbered 9 is first driven from the shaft 91. According to the above principles gearing from the shaft 91 to spindle 9 must be $4R/G \times 9/4$ to produce $9R/G$ at spindle 9. This requirement is satisfied by gears 207 and 215 of 27 teeth and 12 teeth respectively. Gear 213 is an idler. As seen in FIGURES 4 and 5, gear 215 drives gear 220 (9 teeth) of a compound idler 217 and the small gear 221 thereof (8 teeth) is in mesh with an input gear 223 (12 teeth) fastened to the spindle 8 so that 9 r.p.g.'s (spindle 9) x 12/9 x 8/12=8 r.p.g. on spindle 8. The gear 223 drives a compound idler gear 225 which drives an input gear 227 fastened to spindle 7; gear 227 drives a compound idler gear 229 which drives an input gear 231 fastened to spindle 6; gear 231 drives compound idler gear 233 which drives an input gear 235 fastened to spindle 5; gear 235 drives a compound idler gear 237 which drives an input gear 239 fastened to spindle 4; gear 239 drives a compound idler gear 241 which drives an input gear 243 fastened to spindle 3; gear 243 drives a compound idler gear 245 which drives an input gear 247 fastened to spindle 2; and gear 247 drives a compound idler gear 249 which drives an input gear 251 fastened to spindle 1. The spindle 0 is not driven and is therefore stationary.

In each case the gearing connecting each spindle to the next adjacent spindle is such that the speed S of any spindle in revolutions per unit is expressed by the formula $S=N(1-n/N)$, where N is the total number of spindles, $n$ is the number of the spindle as counted from the highest speed spindle (which is counted as 1) through the intermediate spindles to the spindle in question. Thus the speed of spindle 7 would be $10(1-3/10)$ or 7 and that of spindle 0 is $(1-10/10)$ or zero.

Figure 8:
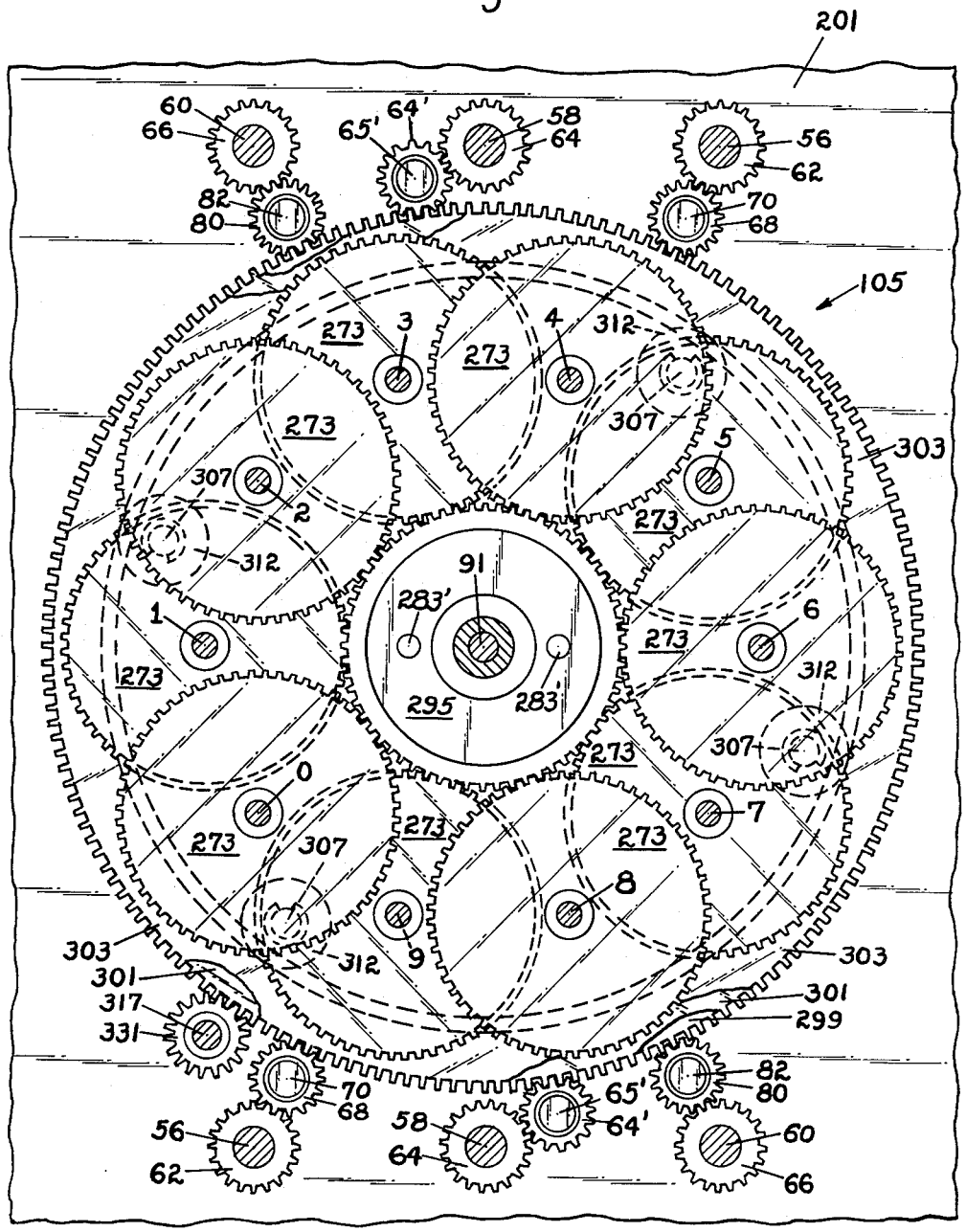
FIGURE 8 is a section taken on the line 8—8 of FIGURE 2 showing the gearing from the tens speed change mechanism to the output from the variator.

Referring partciularly to FIGURES 2, 6 and 8, each spindle 9 through 0 carries three drive control mechanisms which are normally inactive or incapable of transmitting rotation from the spindle to the final output means of the compound variator. Each drive control mechanism is capable of being activated individually to transmit the rotation of the spindle exactly to the final output means in a modified form.

The disclosed compound variator comprises in effect three separate variators or speed variating means, each of which consist of one speed control mechanism on each spindle, a rotatable output member connected to be driven by each mechanism and a selecting means which is operatively associated with each drive control mechanism so that any one of the mechanisms can be activated thereby.

In order to secure the desired results in the mechanisms shown herein, the output from all of the mechanisms of each variator may be modified so that its effect at the final output means of the compound variator is different from that of the other two variators. Since the use to which the compound variator is to be put requires a decimal output, the output from the drive control mechanisms of the one variator is modified so that the rotation of the spindles which are 9, 8, 7, etc., revolutions per gallon are reflected at the final output as .09, .08, .07, etc., revolutions per gallon. The next variator has the outputs modified so that they become .9, .8, .7 r.p.g. while the output of the remaining variator is unchanged so that its effect at the final output is 9, 8, 7, etc.

It will thus be seen that the overall ratio of the compound variator again varies in accordance with an arithmetic progression of three digit numbers 0, .01, .02—9.98, 9.99 having an interval of 1/100, the first and last ratios being zero.

It is of course obvious that fewer or more spindles may be used and any number of individual variators may be compounded. Further the ratios need be chosen to provide the output of each variator or compound variator in accordance with the decimal number system.

The compounding of the output of the individual variators to provide the final output is effected by adding differentials.

In this form disclosed, the drive control mechanisms are shown in the form of differential mechanisms having an input element driven by a spindle and two output elements, the first of which 267 drives the rotatable output member 275 and the other, which is the carrier 259, and is freely rotatable until it is stopped by the selecting means to be described. The stopping of the carrier activates the mechanism so that the spindle drives the first output and thereby the rotatable outpu member.

As stated above, each spindle 9 through zero carries a differential 253 for the tenths speed change mechanism 101, a differential 255 for the units speed change mechanism 103 and differential 257 for the tens speed change mechanism 105. The differentials 253, 255 and 257 are identical with the exception of the output gears which differ only in the number of teeth and which will be described below in conjunction with the input-output ratios of each speed change mechanism.

There are thirty differentials, all of which are alike, ten differentials for the tenths mechanism 101 designated by numeral 253; ten differentials for the units mechanism 103 designated by numeral 255 and ten differentials for the tens mechanism 105 designated by numeral 257. Each differential comprises a carrier 259 which has the form of a 20 tooth star wheel and which is freely journalled on its respective spindle 0 through 9. The number of star wheel teeth is not critical. The carriers for the tenths mechanism rest on the respective input gears for the corresponding spindles, as shown in FIGURE 2 the carrier 259 of mechanism 101 for spindle 6 rests on the input gear 231 of spindle 6. Pinned to the spindle above the carrier is a sun gear 261 having 8 teeth. As shown in FIGURE 2, two integral planetary pinions each comprising a 12 tooth gear 263 and an 8 tooth gear 263' are mounted for rotation on posts 265 which are fixed in and project upwardly from the carrier. Gear 263 meshes with sun gear 261 while planetary gear 263' meshes with a 12 tooth sun gear 267 which is integral with an output gear 269. The unitary gear 267–269 is freely rotatable on the spindle. Thus when the carrier is locked and the spindle is rotated, the rotation of the spindle will be transmitted through sun gear 261 to planetary gear 263 and 263', to sun gear 267 and output gear 269.

Since the No. 6 spindle is shown in FIGURE 4 and since this spindle rotates at six revolutions per gallon, the revolutions of output gear 269 will be at the rate of 6 x $5/12$ x $5/12$ or 6 x $4/9$ = $8/3$ r.p.g.

The output gears 269 of all of the tenths differentials 253 are in mesh with a gear 275 which is rotatably journalled on the shaft 91 and provide a speed reduction from 269 to 275 in the ratio of 25 to 3.

A small sun gear 277 (FIGURE 2) is integral with the gear 275 and provides one input into an additive differential indicated generally by 279. The sun gear 277 meshes with a pair of planetary pinions 281 which are rotatably carried on separate posts 283 attached to and depending from a gear 285 which meshes with all of the output gears 271 of the units differentials 255. The pinions 281 are each integral with a smaller planetary pinion 287 which is in mesh with a second sun gear 289 journalled freely upon the input shaft 91. The gear 285 is freely journalled upon the hub of the sun gear 289 which is integral with another sun gear 291 and which provides an input into a second differential 293. Differential 293 is similar to the differential 279 in that it includes a pair of integral pinions 281' and 287' and posts 283', and a sun gear 289'. The posts 287' are carried by and depend from a wide faced gear 295 which is journalled on the hub of the sun gear 289' and is in mesh with all of the output gears 273 from the tens differentials 257 (FIGS. 2 and 8). The hub of the sun gear 289' passes through a bearing in the upper plate 203 and a gear 297 is staked onto the end of the hub. Gear 297 meshes with a gear 135 fixed to the shaft 137 which is journalled in plate 203 and serves as an input shaft to either an indicator, a machine, or a control mechanism for a machine.

Referring to FIGURES 2, 6 and 8, each variator or speed change mechanism 101, 103 and 105 is provided with a selecting means in the form of a ring gear respectively indicated by the numerals 299, 301 and 303. The ring gears are provided with a single inwardly projecting lug or tooth 305, 305' and 305'' respectively (FIGURES 6 and 7). Four posts 307, which are equally spaced from each other and from shaft 91, project upwardly from the bottom plate 201, parallel to the spindles 0 through 9 and to shaft 91.

Each post 307 supports a stack of flanged rollers 309, 310 and 312 which are separated by spacers 311. The medial planes of the rollers 309 and of the carriers 259 of the tenths differentials coincide, as does the medial plane of a radially inwardly extending flange 314 of the ring gear 299. The flange 314 is supported by the flanges of the rollers 309 so that the ring gear will rotate concentrically with respect to the shaft 91 and during such rotation the tooth 305 which projects radially inwardly from flange 314 will be brought successively into locking engagement with the teeth of the associated carriers 259 to hold the engaged carrier against rotation.

The units ring gear 301 and its lug 305' are similarly supported relative to the carriers 259 of the units differential by means of rollers 310 and the tens ring gear and its lug 305'' are similarly supported with respect to the tens differential carriers 259 by means of rollers 312.

Snap-on retainers 313 hold the rollers and spacers assembled on the posts.

As will be seen from FIGURE 2, the input to the differential 253 from shaft 6 is by way of sun gear 261 which is pinned to this shaft. As this gear rotates, it rotates the planetary pinions 263, 263'. Pinion 263' is in mesh with the sun gear 267. However since 267 resists rotation because of the loss imposed upon it by the gear train which connects it to the apparatus driven by the output shaft 137, the rotation of gear 261 will result in an idle rotation of the carrier which offers less resistance to rotation than does gear 267. Consequently, until the carrier is locked by the tooth 305 of the ring gear 299 there will be no output from sun gear 261 to sun gear 267 and the shaft 137 will not be driven by the tenths differential of spindle 6. Conversely, when the carrier 259 of the tenths differential of shaft 6 is locked against rotation by tooth 305, there will be an output from this differential through sun gear 267 and output gear 269 which will be transmitted to the output shaft.

The same is true for all of the differentials 253, 255 and 257. Since there is only one tooth on each of the ring gears, which can be positioned so as to hold the carrier of any of its associated differentials, it follows that the total output range of settings of the variator is from 000 to 999 in increments of 1, disregarding the positioning of the decimal point for the present.

In order to explain how the speeds of the output gears 269, 271 and 273 of the locked differentials 253, 255 and 257 are modified and combined to rotate gear 135, reference is had to FIGURE 2 wherein the ratio of gears 269 and 275 is $3/25$; that of gears 277, 281 is $1/2$; that of 287, 289 is $1/2$; that of 291, 281' is $1/2$; that of 287', 289' is $1/2$; that of 291, 281' is $1/2$; that of 287', 289' is $1/2$ and that of gears 297, 135 is $3/4$. Thus if we represent the revolutions per unit of measurement (RPU) of the spindle which is driving the locked tenths differential by A and remember that the ratio of the differential is $4/9$, the revolution/unit of gear 135 and shaft 137 will be:

(1) RPU 137 = A x $4/9$ x $3/25$ x $1/2$ x $1/2$ x $1/2$ x $1/2$ x $3/4$ or A x $1/100$

Thus as A varies from 0 to 9 its effect on the output shaft will vary from .00 to .09 r.p.g. in increments of .01 r.p.g.

For example, when the rotation of shaft 137 is transmitted to a cost register having three dials which display the cost in terms of dollars, dimes and cents, wherein one revolution of the cents dial represents 10 cents, 1/10 revolution equals 1¢ and 1/100 revolution equals 1/10¢. Thus the .01 r.p.g. output of the shaft 137 produces the 1/10¢ accumulation which is required on the cost register.

Tracing the effect of the output gear 271 of a locked units differential and representing the r.p.g. of the spindle which drives it by B, the ratio of gears 271, 285 is 2/5; the ratio of the differential 285, 281, 277, 287, 289 is 3/4; that of gears 291, 281' is 1/2; that of 287', 289' is 1/2 and that of 297, 135 is 3/1. Thus the revolutions/unit of shaft 137 will be:

(2) RPU 137 = B x $4/9$ x $2/5$ x $3/4$ x $1/2$ x $1/2$ x $3/4$ or B x $1/10$

Since, as indicated above, a 1/10 revolution of the cents wheel of the cost register equals 1¢, it will be seen that the output of a .1 r.p.g. of shaft 137 which results from the units mechanism produces the required 1¢ accumulation on the cost register.

Similarly, representing by C the RPU of the spindle which is driving a locked differential of the tens mechanism, the ratio of gears 273, 295 is 1/1; the ratio of the differential 295, 281', 291, 287', 289' is 3/4 and the ratio of 297, 135 is 3/1. Thus the RPU of shaft 137 as the result of a differential 257 is (3)    RPU 137 = C x $4/9$ x $1/1$ x $3/4$ x $3/1$ or C x 1

Since, in the example, one revolution of the first register wheel is the equivalent of one dime, it will be seen that a 1 RPU rotation of shaft 137 which results from the tens mechanism will produce the required 10¢ accumulation on the cost register.

To conclude the explanation by a practical example, assume that the input shaft 91 to the variator is driven by a meter for liquid, as in the application by Jauch, and 7 gallons of gasoline are delivered at a price of 32.9¢/gal.

The differential 253 of the tenths mechanism for the 9 spindle, the differential 255 of the units mechanism for the 2 spindle and the differential 257 of the tens mechanism for the 3 spindle will be locked by the respective ring gears 299, 301 and 303.

Differential 253 will produce 7 x 9 x 1/100 or .63 revolutions of shaft 137; differential 255 will produce 7 x 2 x 1/10 or 1.40 revolutions of shaft 137 and differential 257 will produce 7 x 3 x 1 or 21.00 revolutions of shaft 137. The sum of .63, 1.40 and 21 is 23.03 revolutions of shaft 137 since one revolution of the shaft produces one revolution of the cents wheel which is equal to one dime or 1/10 of a dollar, the 23.03 revolutions represent $2.303 which is the product of 7 gallons and 32.9¢/gallon. The register will of course display only the $2.30 and the final digit 3 is represented by a displacement of the cents wheel 3/100th of a revolution beyond its true zero position.

VARIATOR SETTING MECHANISM

As stated above, one of the main advantages of the variator just described is that none of the gears which connect the shaft 91 to drive the output shaft 137 are ever unmeshed. They are in continuous meshing engagement at all times and any one of the ten differentials 253, any one of the ten differentials 255 and any one of the ten differentials 257 can be rendered effective by simply stopping the carrier 259 thereof by rotating the lug of the corresponding ring gear into engagement therewith.

The ring gears are successively interconnected by a transfer mechanism so that when the tenths ring gear 299 is rotated one revolution in either direction between the positions in which it locks the differential of the 9 and zero shaft, it will index the units ring gear one step of 36 degrees. A similar rotation of the units ring gear will produce a similar step of the tens ring gear. Thus it is necessary merely to rotate the tenths ring gear, manually or by means of a motor, to set the variator to any one of its ratios.

Referring to FIGURES 2 and 6, it will be seen that the tenths ring gear 299 and the units ring gear 301 are provided with a gear segment 315 and 315' respectively, which is disposed adjacent the higher order ring gear 301, 303 respectively. A transfer shaft 317 is journalled in the bearing plates 201 and 203 and its axis is contained in a vertical, radial plane T which bisects the angle between radial planes which contain the axis of shaft 91 and the spindles 0 and 9 respectively as shown in FIG. 6. With the sectors disposed to be bisected by plane T as shown in FIG. 6, the corresponding lugs 305, 305' and 305" are also bisected by this plane. Referring particularly to FIGURE 3, an indexing or setting gear 319 is fastened to the transfer shaft by a pin 321 and meshes with the tenths ring gear 299. A detent mechanism 298 comprising a disc 300 is pinned to transfer shaft 317 and is provided with an indentation 302. A transfer gear 323 (FIGS. 2 and 3) and an indexing gear 325 are joined by a hub 327 and are rotatable on the transfer shaft. The hub is provided with a bore 304 in which a spring 306 and a ball 308 are mounted. The ball enters the indentation and serves as a detent. Transfer gear 323 lies in the path of the segment 315 of the tenths ring gear 299 and indexing gear 325 meshes with the units ring gear 301. Another transfer gear 329 and indexing gear 331 are joined by a hub 333 and are also journalled on the transfer shaft and rest on a disc 300' which is pinned to shaft 317. Another detent mechanism is provided between the hub 333 and disc 300'. The transfer gear 329 lies in the path of the segment 315' attached to the units ring gear 301 and indexing gear 331 is in mesh with the tens ring gear 303.

The ring gears 299, 301 and 303 each have 180 teeth while the transfer segments 315, 315', having 19 teeth, the end teeth being shortened to facilitate the meshing of the segments with their respective transfer gears. The indexing gears 319, 325 and 331 and the transfer gears 323 and 329 have 18 teeth. The detent mechanisms 298 insure that the indexing and transfer gears make exactly one complete revolution for each passage of the corresponding transfer segment.

It will thus be seen when the locking tooth 305 (FIG. 6) is engaged in locking engagement with the carrier 259 of the differential 253 for the zero spindle, the partial tooth at the right end of segment 315 will be substantially in engagement with the tooth of gear 323 which is held in radial alignment with plane T by the detent 298. Thus if the ring gear 299 is rotated counterclockwise to move the locking lug into engagement with the carrier 259 of the spindle 1, the transfer gear 323 will be rotated a full revolution when the partial tooth on the other end of the segment substantially loses contact with the radially directed tooth. Thus, in effect, the short teeth impart a ½ tooth advance of the transfer gear while each of the 17 full teeth impart a full tooth advance. Since the ring gear 301 has 180 teeth and the indexing gear 325 has 18 teeth, the ring gear 301 will be rotated 1/10 of a revolution or 36 degrees each time the ring gear 299 passes from locking position 0 spindle to locking position with that of the 9 spindle or vice versa.

A similar indexing of ring gear 303 by ring gear 301 occurs in a like manner.

The transfer shaft 317 of the variator 131 extends through the lower bearing plate 201 and the armature 335 of a magnetic clutch 336 is fastened to its lower end. The segment 337 of the clutch is driven by a reversible motor 338.

Therefore as the motor 338 rotates in either direction and if the clutch is engaged by the circuitry, the transfer shaft 317 is correspondingly rotated.

Summarizing the operation of the transfer mechanism just described, each revolution of shaft 317 causes a revolution of the indexing gear 319; the tenths ring gear 299 will turn one-tenth of a revolution, thereby moving the lug 305 from locking position with one of the tenths differential carriers 259 to locking position with an adjacent tenths differential carrier 259. Assuming that the locking lug 305 initially locked the 0 spindle carriers, each ten revolutions of the transfer shaft 317 will rotate the tenths ring gear 299 one full revolution. Each time the lug 305 unlocks the differential carrier 259 on the 9 or 0 spindle and moves to a position in which it locks the carrier on the 0 or 9 spindle, the segment 315 attached to the tenths ring gear 299 will rotate the transfer and indexing gears 323 and 325 one revolution, thereby moving the lug 305' of the units ring gear 301 from locking position with one units differential 255 into locking position with an adjacent units differential 255. Similarly, once during each revolution of the units ring gear 301, the segment 315' attached thereto will rotate the transfer gear 329 and attached indexing gear 331 one revolution, to move the lug 305" of tens ring gear 303 to unlock one tens differential 257 and to lock an adjacent tens differential 257. Again this transfer occurs as the lug 305' unlocks the differential on the 9 spindle and moves to lock that on the 0 spindle or vice versa.

In other words, the ring gears and the transfer mechanisms operate just like a three wheel, decimal or decade counter, with the transfer from the lower order wheel to the next higher order occurring when the lower order wheel passes from 9 to 0 in an ascending count or when it passes from 0 to 9 in a descending count.

Therefore, the variator 131 is settable to any one of 1,000 settings which in monetary terms range from 00.0 to 99.9¢ in increments of .1¢ and in percentage from 00.0 to 99.9% in increments of .1% by merely rotating ring gear 299 in the proper direction the proper distance.

As will be seen from FIGURE 1 and particularly in FIGURE 9, the ratio indicating register 141 comprises three dials 50, 52 and 54 which display, in terms of tens, units and tenths, the ratio at which the variator is set.

Referring also to FIGURES 4, 6 and 8, the dials 50 are each driven by a shaft 56, gear 62, idler 68 which is journalled for rotation on a stud 70 and which meshes with the ring gear 303 of the speed change mechanism 105. Dials 52 are each driven by a shaft 58, a gear 64, and idler 64' which is journalled for rotation on a stud 65' and which meshes with the ring gear 301 of mechanism 103. Dials 54 are each driven by a shaft 60, gear 66, and a gear 80 which is mounted on a stud 82 and which meshes with ring gear 299 of mechanism 101.

Gears 68, 64' and 80 which are respectively in mesh with the ring gears 303, 301 and 299 have 18 teeth and gears 62, 64 and 66 have 20 teeth. Therefore, for each revolution of either of the gears 68, 64' and 80, the gear 62, 64 or 66 which is respectively in mesh therewith revolves nine-tenths of a revolution. Therefore, for each 36° movement of a ring gear 299, 301 or 303, the respective dials 54, 52 and 50 are indexed nine-tenths of a revolution. When the ring gear rotates counterclockwise or in an ascending direction the two dials which are connected thereto by the gearing and the shafts are rotated 324° in a counterclockwise direction thereby increasing the indication by one and conversely, when the ring gear is rotated in a clockwise direction the two dials are rotated 324° in a clockwise direction thereby decreasing the indication by one.

The dials are of course timed initially to the positions of the ring gears so that they will each display a zero when the ring gears lock the carriers 259 of the zero shaft and they will be stepped successively to display the numerals 1, 2 etc. as the ring gears which are driving them are stepped by the transfer mechanism 155 shown in FIGURE 2.

Ratio selecting apparatus

As shown in FIGURES 1, 9 and 10, the shafts 56, 58 and 60, on opposite sides of the variator, are continued through the bearings in the lower bearing plate 201 and are journalled at their lowermost ends in the base 339 of identical right and left hand frameworks 341 which depend from the lower bearing plate. Each framework supports five predeterminer mechanisms which are designated by the numerals 343-1, 343-2, 343-3, 343-4, 343-5, 343-6, 343-7, 343-8, 343-9 and 343-10.

The number of mechanisms 343 is optional and the number supplied depends on the maximum number of preset ratios needed for any particular application.

Referring to FIGURES 9, 10 and 11, each predeterminer comprises a first, second and third order stop mechanism 349, 347 and 345. Each stop mechanism comprises a presettable cam 369, a ten tooth star wheel 359, about which the cam can be rotated, a detent 385 between the cam and star wheel for holding the cam in any one of ten equally spaced rotative positions with respect to the star wheel and a cam follower device 399 which has a roller 413 which rides on the cam. The stop mechanism cams, star wheels, detents and rollers 413 of a particular predeterminer all are disposed substantially in a common plane.

The order stop mechanisms are identical and the lowest order mechanism is shown in an enlarged section in FIGURE 11. The ten-tooth star wheel 359, having a body portion 360 and a depending hub portion 361 with a central bore 363, is mounted on the lowest order indicator dial shaft 60 and secured against axial and rotational movement by a pin 365 which is inserted through a hole 367 drilled through the hub and the shaft.

The cam 369 is provided with a bore 371 and a counterbore 373 which telescopically receive the hub portion 361 and the body portion 360 of the star wheel 359. The body portion 370 of the cam 369 is provided with a peripheral cam surface 375 which is concentric with the axis of the shaft 60 and which surface is interrupted by an axially extending, radial notch 377. A hole 379 extends inwardly through the wall separating the cam surface from the counterbore 373 and the outer portion of the hole is enlarged by a counterbore 381. The hole 379 and the counterbore 381 are preferably diametrically opposite the notch 377, but may be radially displaced from the notch by any interval which is a multiple of 36°. The outer extremity of the counterbore 381 is threaded, as indicated by the numeral 383. A detent 385 extends slidably through the hole 379 and into contact with the perimeter of the star wheel 359 and has a head portion 389 which is slidable in the counterbore 381. A spring 391 is seated against the head 389 of the detent member within the counterbore 381 and is compressed by a plug 393 which is received by the threads 383 of the counterbore. The plug is preferably dressed flush with the cam surface 375. A collar 395 is pinned to the shaft 60, as indicated by the numeral 397, to retain the cam 369 in the axial position relative to the star wheel shown in FIGURES 9 and 11, in which position the cam is rotatable stepwise on the hub 361 of the star wheel 359. The detent member 385 coacts with the star wheel to hold the cam 369 in any of ten rotative positions relative to the star wheel 359 to provide a method for presetting each cam to any one of the positions numbered from 0 to 9 which correspond to the corresponding ten (0 to 9) positions of the ring gear which drives the star wheel. In the case of the lowest order stop mechanism described above and shown in FIGURE 11, the lowest order ring gear 299 drives shaft 60 and its star wheel 359 for the lowest order stop mechanism of each predeterminer. Further the deepest parts of the notches between the teeth of the star wheels are numbered to correspond with the dial indicator carried by the shaft 60. To illustrate this, if the indicators on shafts 56, 58 and 60 read 299, indicating that the ratio of the compound variator is 29.9, the notches would be numbered as shown in FIG. 10. The method of presetting each of the predeterminers 343-1 to 343-10 to any selected ratio will be disclosed below.

Referring particularly to FIGURES 9, 10 and 11, each cam follower 399 comprises a body 355 which is an elongated hollow block of rectangular cross section and having an opening 405 at the end adjacent a cam. A plunger 401 is telescopically received within the block through opening 405. The longitudinal axes of the various plungers 401 are perpendicular to and intersect the longitudinal axis of the corresponding shaft 56, 58 or 60. The end of the plunger which is disposed in the blank is provided with a bore 407 to receive a spring 403 and the opposite end is bifurcated at 409 to support an axle 411 for a roller 413. The roller has a radius which is slightly smaller than the radius of the notch 377 in the cam surface 375, is adapted to ride upon the face of the cam and to enter the notch 377 when the notch is rotated into alignment with the roller.

As shown particularly in FIGURE 10, a finger 415 extends laterally across the exterior end of the plunger 401 of each first order cam follower 399, protrudes in both directions from the plunger and is fastened thereto in any suitable manner, as by soldering or brazing. The right hand end (FIG. 10) 417 of the finger is in operative engagement with the actuating plunger of the corresponding one of the switches 357-1 to 357-10, inclusive which is associated with the particular one of the predeterminers which is under consideration. The left hand end 419 of the finger 415 extends in the direction of the second order cam follower for that predeterminer which is similarly constructed and is provided with a finger 421, the right hand end 423 of which is offset in the direction of the cam 369 to overlie the left hand end 419 of the finger 415. The left hand end 425 of the finger 421 extends toward the third order follower of the predeterminer, which is similarly constructed and which carries a finger 427 which extends only to the right, as indicated by the numeral 429, and overlies the left hand end 425 of the finger 421.

Referring to FIGURE 10, the rollers 413 for the first, second and third order followers respectively, ride upon the cam surfaces 375 of their corresponding cams 369. The first order cam 369 will, of course, revolve ten times for each revolution of the second order cam and one hundred times for each revolution of the third order cam, therefore, the notch 377 of the first order cam 369 may be repeatedly aligned with the roller 413 of its follower before the notches 377 of the second and third order cams become aligned with their respective rollers 413. If the first order roller were permitted to enter its notch independently of the other rollers, the switch 357 of the predeterminer would be actuated prematurely. The finger structure just described prevents the rollers 413 of each lower order follower from entering its cam notch until that of the adjacent higher order follower actually occupies its notch. Thus, in FIG. 10, until left hand roller 413 has entered notch 377 of left hand cam 369, finger 429 acts on finger 425 to hold the middle roller 413 out of its cam notch. Similarly finger 423 acts on 419 to hold right hand roller 413 out of its cam notch. The rollers therefore will enter their resective notches in order, from left to right and switch 357 will not be actuated until all three occupy their respective notches. The movement of the finger 415 toward its cam 369 as its roller enters the cam notch, releases the pressure on the plunger of the associated switch 357 and the mechanism thereof opens the switch contacts, which were heretofore held closed, for a purpose which will be disclosed hereinafter. The switches are accordingly referred to herein as "normally open switches."

CONTROL APPARATUS AND CIRCUITS

As shown in FIGURE 1, ten individual predeterminers have been provided so that the compound variator, as shown, can be set automatically to any one of ten preset ratios. In order to select the predeterminer which is to be rendered effective and to adjust the variator to the selected ratio requires a control apparatus which will now be described in detail.

Figure 12:
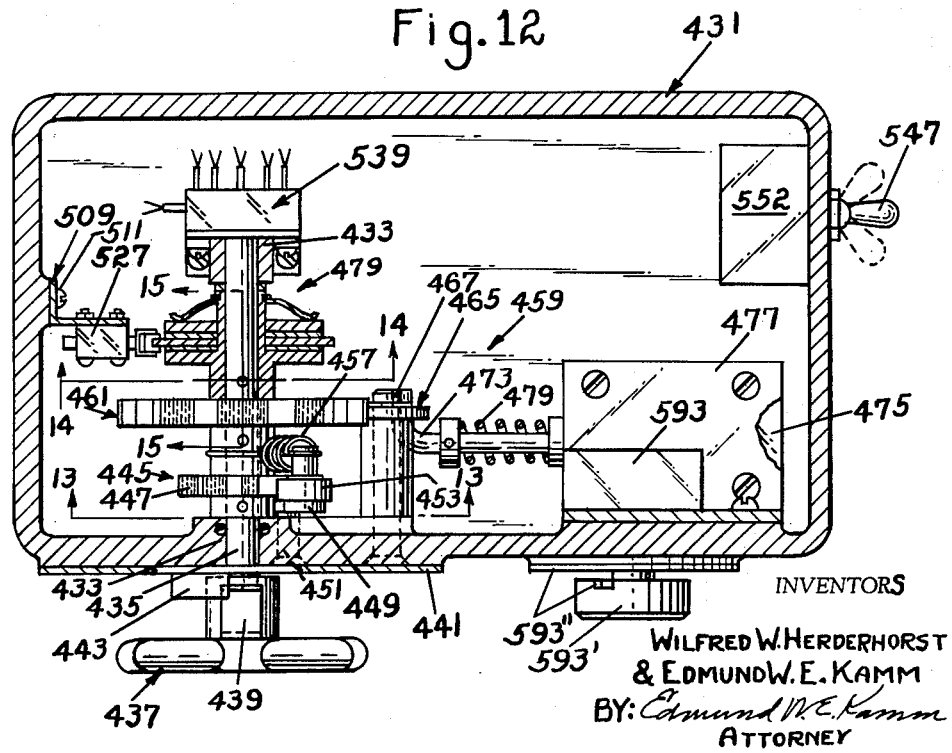
FIGURE 12 is a plan view with parts in section of the manually operable predeterminer selector mechanism and stop mechanism.

Referring to FIGURES 12 to 16, inclusive, and particularly to FIGURES 12 to 12A, the control apparatus is mounted in a box or case 431 which is provided with a pair of bearings 433 which support a rotatable shaft 435. The shaft extends through one wall of the box and carries a selector knob 437, equipped with a pointer 439, at its outermost end.

A dial 441 is radially divided into ten stations each representing one of the predeterminers and the dial is also provided with a projection 443 disposed in the path of the pointer, to prevent the rotation of the selector directly from 1 to 10 or vice versa.

A detent mechanism 445 is provided for centering the pointer 439 at any selected station and includes a star wheel 447 (FIGURES 12 and 13) having ten lobes carried by the shaft 435, a pawl 449 pivotally mounted at its lower end to the case 431 by a stud 451 and provided with a roller 453 at the upper end, which roller enters recess 455 between adjacent lobes of the star wheel 447 when the pointer is at a station. A spring 457 is attached to the shaft 435 and to the roller end of the pawl 449 for yieldably holding the roller in engagement with the star wheel and exerting a force which centers the pointer at the nearest station when the operator releases the knob.

Also shown in FIGURES 12 and 13 is an interlock device shown generally by 459, for locking the knob 437 and its associated parts against rotation while the ratio is being set. This device 459 includes a locking disc 461, carried by the shaft 435 and provided with ten notches 463 extending inwardly from the periphery thereof, and a pawl 465 pivotally mounted at its mid-point on a stud 467 anchored in the case 431. The pawl is provided at its upper end with a locking element 469 which is adapted to enter notches 463 and at its lower end with a lost motion slot 471. A rod 473 is connected to the armature of a solenoid 475 (FIG. 12) which is attached to the case 431 by a bracket 477. The rod is biased by a spring 479 to normally hold the pawl 465 out of engagement with the disc 461, but when the coil of the solenoid is energized, the pawl is pivoted so that its locking element 469 enters the recess 463 which is in alignment therewith at the time, to prevent rotation of the knob 437 until the circuit to the coil is interrupted.

As previously disclosed, and shown in FIG. 2, the ring gears 299, 301 and 303 are rotated in a counterclockwise direction to decrease the ratio and in a clockwise direction to increase the ratio. The drive to the ring gears is from the reversible motor 338 through the magnetic clutch 336 to the transfer shaft 317.

The direction in which the knob 437 is rotated determines the direction of rotation of the motor 338 and the ring gears 299, 301 and 303 of the compound variator 131. This directional control is effected by means of a switching apparatus 479 shown generally in FIGURE 12 and in detail in FIGURES 14 and 15.

A clutch plate 481 has concentric hubs 483 and 485 on opposite sides thereof and a central bore 487 which receives shaft 435. The plate is fixed on the shaft 435 by a pin 489. The face of the disc portion which is directed away from the cam 461 is provided with a friction material 493.

A cam 495 is rotatably mounted on the hub 485 in contact with the friction material 493 of the clutch plate 481. The edge of the cam has a shallow radial recess 499, a deep recess 501, approximately twice the depth of recess 499, and a radius 503 joining the recesses. The cam has an additional notch 505 which receives a fixed stop 507 which is a part of the switch bracket 509 which is fastened to the case by screws 511, as shown in FIGURE 12.

A second clutch plate 513 provided with a friction material 515 and a central opening 517, is mounted for rotation on the hub 485 of the clutch plate 481 in engagement with the other side of the plate cam 495. The cam is frictionally clamped between 481 and 513 by a leaf type spring 519 which is also provided with a central opening 521 large enough to receive the hub 485. A groove 523 in the hub 485 receives a retainer 525 which holds the spring compressed against plate 513.

A single-pole, double-throw switch 527 (FIG. 14) is mounted on the bracket 509 by screws 529 and the operating roller 531 of the switch actuator rides on the periphery of the cam 495. The projection 507 on the switch bracket 509 which engages the notch 505 of the cam 495 limits the rotation of the cam 495 so that roller 531 will rest either in the shallow or the deep notch 499 or 501.

As previously stated, the angular movement of the pointer 439 between the adjacent, numbered dial stations (FIG. 12A) is 36°. The recesses 499 and 501 are spaced less than 36°, so that rotation of the knob 437 in either direction to an adjacent station insures that the cam 495 will always occupy one or the other of its positions which are determined by engagement of stop 507 by the sides of the cam notch 505.

Figure 16:
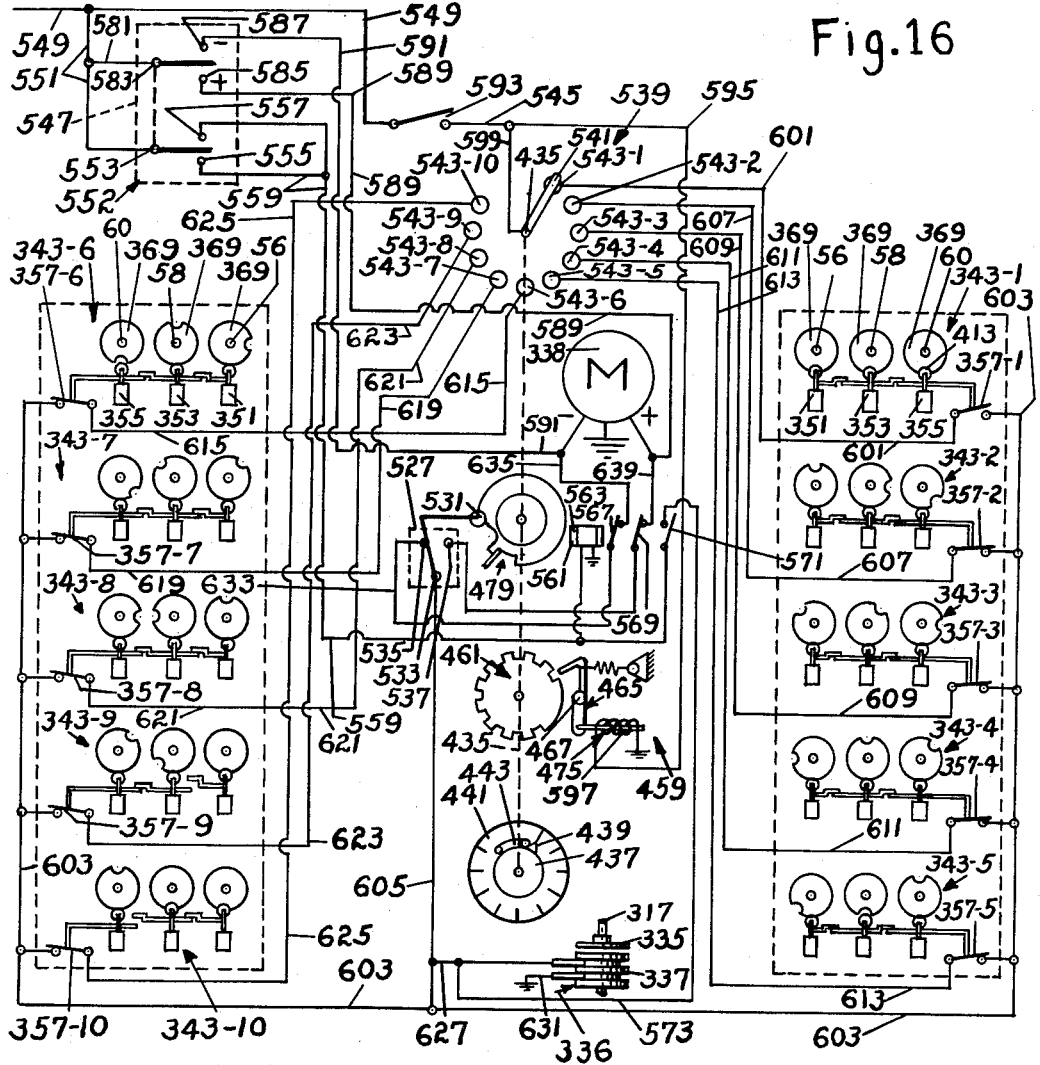
FIGURE 16 is a circuit diagram.
Figure 15:
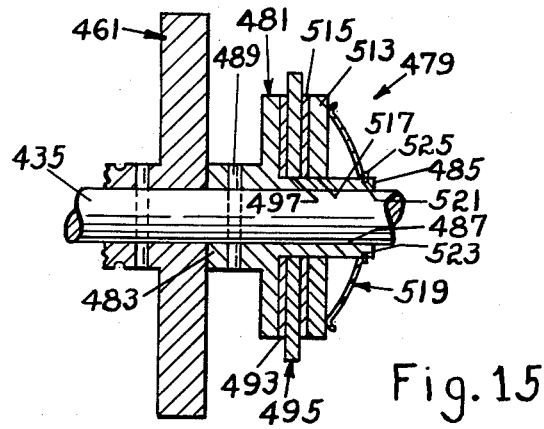
FIGURE 15 is a section taken on the line 15—15 of FIGURE 12 showing the direction initiating apparatus in detail.

It is obvious that upon rotation of the knob 437 in a clockwise direction, the cam 495 will also be rotated clockwise and the roller 531 for the switch 527 will come to rest in the deep recess 501. Referring to FIGURE 16, it will be seen that in this position the movable contact 533 of switch 527 will engage fixed contact 537. Upon further rotation of the knob 437, in the same direction, the cam 495 remains stationary while the shaft 435 continues to turn. When the knob 437 is rotated in a counterclockwise direction, the cam 495 is returned to the position shown in FIGURE 14 wherein the roller 531 is seated in the shallow notch 499 and the contacts 533, 535 of the switch 527 are closed and the contacts 533, 537 are open.

Referring to FIGURES 12 and 16, a ten station rotary predeterminer selector switch 539 is mounted within the case 431 and has a movable contact 541 attached to the shaft 435 and ten stationary contacts respectively designated by the numerals 543–1 to 543–10 which have the same circumferential spacing as the numbered stations on the dial (FIG. 12A), the notches 463 of the interlock disc 461 and the star wheel 477.

CIRCUIT DIAGRAM

(FIGURE 16)

As previously disclosed, any of the ten predeterminer mechanisms 343 may be preset to any ratio within the full range of the compound variator 131, which in this instance ranges from 000 to 999.

However, in order to provide sequential correlation between the values of the numbers shown on dial 441 the values of the ratios set on the predeterminers, it may be helpful if the predeterminer 343–1 is preset to the lowest ratio, successively numbered predeterminers 343–2, 343–3 etc. are preset for the successively larger ratios of the selected group of ratios.

In order to explain the circuitry disclosed herein, it is necessary to bear in mind that the settings of the various predeterminers 343–1 to 343–10 must be effected before the compound variator can be operated automatically in response to the operation of selector knob 437 relative to its dial 441.

In this explanation it is advantageous to have in mind the correlation of the particular ratios of the compound variator 131 which are to be established in response to the setting of pointer 439 relative to the numbered stations of the dial.

For this purpose, it will be assumed that the variator 131 is set initially at its lowest ratio, i.e., that the ratio indicator 141 display 000. This means that the lug 305 of the tenths ring gear 299 is engaged with the carrier 259 of the differential 253 on shaft 0, the lug 305' of the units ring gear 301 is engaged with the carrier 259 of the differential 255 also on shaft 0, and the lug 305" of the tens ring gear 303 is engaged with the carrier 259 of the differential 257 on shaft 0. Shaft 0 is stationary and consequently with an input at shaft 91 there is no output at shaft 137.

It is also assumed that the gearing from whatever device is driving the variator, to the input shaft 91 thereof is such that the settings of the individual variations 101, 103 and 105 represents tenths, units and tens respectively.

Further, as an example the ratios to be automatically set in response to the setting of pointer 439 to the corresponding numbered stations on the dial 441 are as shown in the following table.

| Station No. on dial 441: | Ratios to be preset on 343–1 to 343–10 |
|---|---|
| 1 | 29.4 |
| 2 | 30.9 |
| 3 | 31.2 |
| 4 | 31.5 |
| 5 | 32.9 |
| 6 | 33.7 |
| 7 | 34.3 |
| 8 | 34.8 |
| 9 | 35.6 |
| 10 | 36.1 |

Some provisions must be made in the circuitry to facilitate the presetting of the predeterminers. As shown in FIGURE 12 a manually operated double pole, double throw switch 552 having a central open position and opposed closed positions, is mounted in the box 431 and is connected with the motor 338 and its clutch 336, so that the motor can be operated in either direction and can be connected to drive the variator setting or transfer shaft 317 independently of the switch 527 which is operated by the selector knob.

*Circuit A* controlled by this switch 543, when it occupies its first closed position, extends from the main 549 through a branch 551, contacts 553–555 of the switch 552 and the wire 559, to the coil 561 of a relay 563 and to ground. The energization of this relay opens two sets of normally closed contacts 567 and 569 to disable switch 527, and closes a normally open set of contacts 571 to extend Circuit A through a wire 573 to supply current to the field coil of the magnetic clutch 336 which will be correspondingly engaged.

These same functions will be performed when switch 552 is in its second closed position (553–557) because the contacts 555–557 are both connected to wire 559.

When switch 552 occupies its first closed position, its movable contact 583 will engage the fixed contact 585 to actuate the motor in one direction through

*Circuit B* from the main 549 through wires 551, 581, movable contact 583 fixed contact 585, wire 589 to the "plus" side of the motor 338 and to ground. The motor rotates the transfer shaft 317 in a counterclockwise direction and the ring gears 299, 301 and 303, in a clockwise or ratio increasing direction.

When switch 552 occupies its second position, movable contact 583 engages fixed contact 587 to apply power to

*Circuit C* from 549, through 551, 581, 583, 587, 591, the negative side of the motor to ground which will cause the motor and its associated mechanism to rotate in a direction opposite to that caused by Circuit B.

When the registers 141 (FIGURE 9) are advanced, by the operation of Circuit B, to display the ratio 29.4, which is the lowest ratio shown in the table above, the operator then shifts the operating lever 547 for the switch 552 to the "off" position thereby breaking Circuits A and B to stop the motor 338 and disengage the clutch 336. The operator will then rotate the cam 369 for each of the three orders of the predeterminer 343–1 until the cam notches 377 are aligned with their corresponding rollers 413. The detents permit the rotation of the cams relative to the star wheels 359 and the shafts which are, of course, stationary. When the rollers 413 enter the notches 377 the contacts of the switch 357–1 open.

The operator then recloses Circuits A and B in the same manner as above and reopens it when the register 141 (FIGURE 9) indicates the ratio 30.9 (which is the second ratio of the table). He will then rotate the cam 369 for each of the orders of the predeterminer 343–2 until the notches 377 thereof are aligned with the corresponding rollers 413 and switch 357–2 is open.

This process is repeated until each of the predeterminers have been preset to the desired ratio.

If all ten predeterminers have been preset as described, the variator 131 setting will be that for ratio 10 and 36.1 will be shown on indicators 141. If the pointer 439 for the knob 437 is in any other position, it is now moved into alignment with the 10 marking on the position indicating dial 141.

*Circuit C* is provided so that the predeterminers 343 may be preset in reverse order from that explained above, or, if when presetting is performed in the ascending direction and the operator accidentally overruns a ratio, he can return to the desired ratio.

Whenever the variator is to be operated, the operator must first see that the pointer 439 is pointing to the proper numeral on the dial 441. If it is, he may proceed to close the "Operate" switch 593 but if it is not, he must first rotate the pointer to the proper numeral and then close the switch 593. The switch 593 is mounted in box 431 and has a knob 593' and indicator means 593" disposed adjacent the selector means as shown in FIG. 12A. Movement of knob 593' to the "Operate" position will close switch 593 and

*Circuit D* from the main 549 through the "Operate" switch 593, a wire 595, the coil 597 of the solenoid 475 and to ground. The solenoid retracts its armature thereby pivoting the pawl 465 into latching engagement with locking disc 461 (FIGURES 12, 13 and 16) to prevent rotation of the selector knob 437.

If we assume that the pointer 439 had been set, during the prior operation of the variator, to numeral such as 5 on the dial 441 which represents a ratio of 32.9 and that it is desired to operate at a ratio of 29.4 represented by numeral 1 on the dial, the rotation of knob 437 from 5 to 1

15 would have actuated switch 527 (FIG. 14) to close contacts 553–535.

The same rotation would have rotated blade 541 of the predeterminer selector switch 539 to contact 541–1 thereof as shown in FIG. 16.

Further, since the variator had been previously set at numeral 5, only switch 357–5 of predeterminer 343–5 will be open, all the rest, including 357–1 for predeterminer 343–1, will be closed.

Thus when the "Operate" switch 593 is closed, Circuit D described above will lock the selector knob and its associated mechanisms.

Circuits E–1 and F–1 will also be closed to clutch the motor 338 to the ratio setting shaft 317 of the variator and to energize the motor to rotate in the proper direction. Since the variator ratio setting is to be lower than the prior setting, the motor will have to be rotated in the minus direction as will be seen by tracing circuits E–1, F–1.

Circuit E–1 extends from the main 549 through operate switch 593, wire 599, movable contact 541 of the predeterminer selector switch 539 through the stationary contact 543–1, wire 601, contacts of the switch 357–1 (which are closed as explained above) of predeterminer 343–1, wires 603, 605, 627, the coil of clutch 336 to ground. The motor is thus connected to shaft 317.

Circuit F–1 is the same as E–1 except that instead of following wire 627 to the clutch coil, it continues through wire 605 to blade 533 of direction switch 527. Since this has been set to close contacts 533–535 as explained above, this circuit continues through wire 633, relay switch 567, wire 635, the minus side of motor 338 to ground. Thus the variator will be driven in a ratio decreasing direction.

Had the switch 527 been set to close 533–537, which would have occurred, had the ratio selector been set to a higher ratio than a lower one, then circuit F–1A would have been established.

Circuit F–1A is the same as Circuit F–1 except that from the blade 533 of the direction switch 527 it extends through contact 537 wire 571, relay switch 569, wire 639, the plus side of motor 338 to ground so that the motor will drive shaft 317 of the variator to increase rather than decrease the ratio.

As the variator transfer shaft 317 is driven by motor 338, the shafts 56, 58 and 60, which move the cams 369 and the dials of register 141, are rotated simultaneously with the ratio setting means, and when the ratio which has been preset on the effective predeterminer 343–1 is reached, the notches 377 of the cams 369 of this predeterminer will all reach alignment with their corresponding rollers 413 and switch 357–1 will be opened. This immediately deenergizes circuit E–1 to the clutch which opens and it also deenergizes circuit F–1 to the motor. Since the clutch opens quickly, the motor may coast to a stop without altering the setting of the variator.

Circuit D to the locking solenoid 475 remains energized until the "Operate" switch 593 is opened.

It will be seen that a group of circuits corresponding to E–1, E–2 and E–2A are provided for each of the predeterminers. They are generally the same with the exception that each group is connected from the blade 541 to the wire 603 by way of a different fixed contact of the selector switch and through the switch 357 of a different predeterminer. Thus Circuits E–2, F–2 and F–2A are the same as E–1, F–1, F–1A except that they extend from blade 541 of the selector switch 539 through fixed contact 543–2, wire 607, the switch 357–2 of the second predeterminer and via wire 603 to the motor and clutch.

Circuits E–3, F–3 and F–3A include the movable contact 541, the stationary contact 543–3, wire 609, the predetermined stop switch 357–3 and wire 603.

Circuits E–4, F–4 and F–4A include the movable contack 541, the stationary contact 543–4, wire 611, the predetermined stop switch 357–4 and wire 603.

16

Circuits E–5, F–5, F–5A include the movable contact 541, and stationary contact 543–5, wire 613, the switch 357–5 and wire 603.

Circuits E–6, F–6, F–6A include the movable contact 541, the stationary contact 543–6, wire 613, the switch 357–6 and wire 603.

Circuits E–7, F–7 and F–7A include the movable contact 541, the stationary contact 543–7, wire 619, the switch 357–7 and wire 603.

Circuits E–8, F–8 and F–8A extend from the movable contact 541 through the stationary contact 543–8, wire 621, the switch 357–8 to wire 603.

Circuits E–9, F–9 and F–9A extend from the movable contact 541 through the stationary contact 543–9, wire 623, the switch 357–9 and wire 603.

Circuits E–10, F–10 and F–10A extend from the movable contact 541 through the stationary contact 543–10, wire 625, the switch 357–10 to wire 603.

Thus for each of the ten possible settings of pointer 439 relative to the dial 441 a corresponding predeterminer is provided and is connected to the fixed contact of the selector switch 539. Upon closing of the "Operate" switch 593, subsequent to operation of the pointer 439, the pointer and associated parts will be locked, the motor will be clutched to the variator transfer shaft 317, the variator will be driven in the proper direction until the preset ratio is established whereupon the stop switch for the effective variator will declutch the motor from shaft 317 and deenergize the motor. Registers 141 show the ratio to which the variator has been set.

OPERATION

The first step which must be taken is to preset the required number of predeterminers to the ratio which is to be established by each on the composite variator. Because of the fact that the direction of operation of the motor 338 follows the direction of rotation of the ratio selector knob 437, the predeterminers 343–1 to 343–10 must be preset to ratios in an ascending order. All ten of the predeterminers do not have to be preset unless needed. In case only five ratios are required, these can be preset on any five predeterminers so long as the ascending order of ratios is maintained. The numerals on dial 441 corresponding to the predeterminers which are not being used should be blanked out. It is obviously advantageous, of course, when less than the full number of predeterminers are being used, for example 5, to preset the predeterminers 343–1 to 343–1 so that the ratios can be selected by rotating the selector knob between numerals 1 to 5 on the dial.

As indicated in the table in column 13 ten ratios are to be preset to correspond respectively to the ten numbers shown on dial 441.

Accordingly, the first predeterminer 343–1 will be operated by moving the ratio presetting controls comprising switch 543 in one direction or the other, depending upon whether the ratio displayed on register 141 is higher or lower than the ratio to be preset on the first predeterminer.

As a matter of logical procedure, if the ratios are to be preset in order from low to high, it would be advantageous but not necessary, to operate switch 543 until the register 141 displays a ratio lower than the 29.4 ratio which is to be set, then switch 543 would be reversed to reverse the direction of motor 338 and would be held until register 141 displays 29.4, whereupon the switch is opened.

It is also advantageous but not necessary to set the selector indicator 439 to indicate numeral 1. With the parts in this position, the operator will manually turn the three cams 396 of predeterminer 343–1 until the rollers 413 enter the notches 377 thereof.

When this setting has been made indicator 441 is advanced to indicate numeral 2 and the switch 543 will be again closed in the proper direction to advance register 141 to the next higher ratio, 30.9 whereupon the switch is reopened and the three cams 396 of the second predeterminer 343-2 are manually turned until their respective notches 377 are occupied by the respective rollers 413 for that predeterminer.

This process is repeated for each of the successively higher ratios shown on the chart, terminating with a ratio 36.1 having been preset on the predeterminer 343-10 which corresponds to numeral 10 on dial 441.

If the pointer 439 has been set to the corresponding numeral for each presetting operation, the machine is ready for regular operation without additional steps. If the pointer has not been set as described, it is necessary either to turn the pointer to numeral 10 on the dial, since this corresponds to the 36.1 ratio which is indicated on register 141, or to operate switch 543 to run the motor 338 in a minus direction until the register 141 displays the ratio corresponding to that which is indicated by the numeral at which the pointer is set. In any case, immediately prior to the time of the first operation of the machine, after completion of presetting of the predeterminers, the ratio corresponding to the indicated numeral must coincide with the ratio indicated on register 141, otherwise the direction switch 527 may not cause rotation of the motor 338 in the proper direction.

Assuming that the machine has been conditioned as explained above and that the indicator is set at 10, the operator desiring to establish the ratio corresponding to number 5 will simply rotate the knob 437 in a counterclockwise direction (FIG. 12A) until pointer 439 indicates numeral 5.

This action sets direction switch 527 so that motor 338 will run in the minus direction. Simultaneously the blade of selector switch 539 will rest on contact 543-5.

Circuits D, E-5 and F-5 will be conditioned for operation and as soon as the operating switch 593 is closed, the clutch 336 will be energized, the motor 338 will be energized and will rotate in the minus direction, the cams 369 of predeterminer 343-5 will be driven toward the positions in which all of their notches will be aligned with the respective rollers and when this occurs, the switch 357-5 will open and break circuits to declutch the motor from shaft 317 and to stop the motor. The ratio thus set on the variator will be displayed on register 141. Accordingly when the input shaft 91 of the variator is driven by any device the rotational displacement of the shaft will be multiplied by the established ratio of the variator and the rotational displacement of the output shaft 137 will be proportional to the product just mentioned.

While the structure disclosed herein provides three individual decimal variators which are compounded to provide ratios off rom zero to 999 in steps of one unit, it is obvious that the number of individual variators and compounding differentials could be increased so that the range of ratios could be from zero to 99999 or more in intervals of one, subject only to mechanical limitations such as torque loads imposed by the gears, speed of operation required, etc., or the number of variators could be decreased to from zero to 9, in intervals of one.

Obviously, the number of cams 369 required by the predeterminers would vary directly with the number of individual variators used in the compound variator since the setting of each variator depends upon the position to which its corresponding cam is preset.

Further, the ratios available could be based on number systems other than the decimal system which has been used for purposes of illustration.

It is obvious that various changes may be made in the form, structure and arrangement of parts of the specific embodiments of the invention disclosed herein for purposes of illustration, without departing from the spirit of the invention. Accordingly, applicants do not desire to be limited to such specific embodiments but desire protection falling fairly within the scope of the appended claims.

We claim:
1. A compound speed variating means comprising, in combination:
   (a) an input shaft and an output shaft,
   (b) a number of speed variators connected to be driven by said input shaft and each having an output element,
   (c) a number of differentials connected to be driven by the output elements of the speed variators and connected to drive the output shaft in proportion to the sum of the speeds of said output elements,
   (d) each speed variator comprising a number of drive trains, which are normally ineffective to drive said output element, said trains being adapted to be rendered effective individually to drive the corresponding output element, and each train being constructed so as to drive its output element at a ratio relative to said input shaft, which is different from that of any other train, when said train is rendered effective,
   (e) a predeterminer mechanism including means for controlling all of said variators for preselecting a group of drive trains, consisting of one train of each variator, to be rendered effective,
   (f) said predeterminer mechanism including distinct, presettable means corresponding to each variator for preselecting a particular drive train of such variator to be rendered effective, and
   (g) means, controlled by said predeterminer mechanims, for rendering the preselected group of trains effective.

2. The structure defined by claim 1 which includes
   (a) a plurality of predeterminer mechanisms associated with all of said variators, each mechanism being adapted to preselect a different group of drive trains, consisting of one train of each variator, to be rendered effective to drive the respective output elements;
   (b) each of said predeterminer mechanisms including distinct, presettable means corresponding to each variator for preselecting a particular drive train of such variator to be rendered effective,
   (c) all but one of said predeterminer mechanisms being normally inoperative to select its preselected group of drive trains,
   (d) settable means for rendering any one of said predeterminer mechanisms operative to select its preselected group of drive trains and
   (e) means, controlled by said operative predeterminer mechanism, for rendering effective the group of trains preselected by said operative mechanism.

3. The structure defined by claim 1 which includes means for indicating the ratio to which the compound variator is set.

4. The structure defined by claim 2 which includes means for preventing setting of said settable means while a preselected group of trains is being rendered effective.

5. The structure defined by claim 2 in which the distinct, presettable means of each predeterminer mechanism, corresponding to a particular variator, have settings which are at least equal in number to the number of drive trains of said variator.

6. The structure defined by claim 5 in which each setting of each presettable means corresponds to a different predetermined drive train of the corresponding variator.

7. The structure defined by claim 2 which includes a motor for driving said controlled means and means for starting said motor.

8. The structure defined by claim 7 wherein said operative predeterminer mechanism includes means for rendering said motor ineffective to drive said controlled means when said preselected group of drive trains is rendered effective.

9. The structure defined by claim 2 wherein each variator comprises ten drive trains having ratios respectively of from zero to nine inclusive, said zero train serving to lock the output member against rotation.

10. The structure defined by claim 9 wherein the speed imparted by each variator to the output shaft, through said differentials is proportional to the product of the ratio of the effective drive train of the variator and a different one of adjacent decimal orders, equal in number to the number of variators.

11. A compound speed variator means comprising, in combination,
(a) an input shaft and an output shaft,
(b) a number of speed variators connected to be driven by said input shaft and each having an output element,
(c) a number of differentials connected to be driven by output elements of the speed variators and connected to drive the output shaft in proportion to the sum of the speeds of said output elements,
(d) each speed variator comprising a number of drive trains, which are normally ineffective to drive said output element, said trains being adapted to be rendered effective individually to drive the corresponding output element and each train being constructed so as to drive its output element at a ratio relative to said input shaft, which is different from that of any other train, when said train is rendered effective,
(e) each speed variator also comprising a device mounted for movement to and from coacting position relative to any one of said trains and adapted, in such position, to render a train effective,
(f) a plurality of predeterminer mechanisms associated with all of said variators, each mechanism being adapted to preselect a different group of drive trains, consisting of one train of each variator, to be rendered effective to drive the respective output element,
(g) each of said predeterminer mechanisms including distinct, presettable means corresponding to each variator for presetting a particular drive train of such variator to be rendered effective, said predeterminer mechanisms being normally inoperative,
(h) settable means for rendering any one of of said predeterminer mechanisms operative,
(i) means for moving said devices toward coacting position relative to the group of drive trains preselected by said operative mechanism;
(j) and means responsive to said operative mechanism for stopping said devices when the trains preselected by said operative predeterminer mechanism are rendered effective.

12. The structure defined by claim 11 which includes a motor connected to drive said devices and means for energizing said motor.

13. The structure defined by claim 11 which includes indicator means for indicating the ratio at which said variators have been set.

14. The structure defined by claim 11 which includes a reversible motor connected to drive said devices in one direction to increase and in another direction to decrease the ratio of the speeds of the input and output shafts and means operable by said settable means for predetermining the direction of operation of said motor.

15. The structure defined by claim 14 which includes means for locking said settable means while said motor is energized.

16. The structure defined by claim 12 which includes a clutch connecting said motor to drive said devices and means for engaging and disengaging said clutch when said motor is energized and deenergized respectively.

17. The structure defined by claim 14 which includes selectively operable additional means, independent of said settable means, for energizing said motor to operate in either of its directions.

18. The structure defined by claim 11 which includes:
(a) a motor connected to drive said devices,
(b) a control switch adapted to be connected to a source of power,
(c) a stop switch operatively associated with each predeterminer mechanism and adapted to be held closed thereby when the group of drive trains preselected by said mechanism are ineffective and to open when said group of drive trains are rendered effective,
(d) said stop switches being connected in parallel with each other and in series with said motor,
(e) said settable means including a selector switch having one contact connected with said control switch and a plurality of contacts each connected to one of said stop switches and arranged for selective, individual engagement by said one contact for rendering one predeterminer mechanism operative and for energizing said motor through the stop switch of the operative predeterminer mechanism when said control switch is closed.

19. A compound speed variating means comprising, in combination,
(a) an input shaft and an output shaft,
(b) a number of speed variators connected to be driven by said input shaft and each having an output element,
(c) a number of differentials connected to be driven by output elements of the speed variators and connected to drive the output shaft in proportion to the sum of the speeds of said output elements,
(d) each speed variator comprising a number of drive trains, which are normally ineffective to drive said output element, said trains being adapted to be rendered effective individually to drive the corresponding output element and each train being constructed so as to drive its output element at a ratio relative to said input shaft, which is different from that of any other train, when such train is rendered effective,
(e) each speed variator also comprising a device mounted for movement to and from coacting position relative to any one of said trains and adapted, in such position, to render a train effective,
(f) a plurality of predeterminer mechanisms associated with all of said variators, each mechanism being adapted to preselect a different group of drive trains, consisting of one train of each variator, to be rendered effective to drive the respective output element,
(g) settable means for rendering any one of said predeterminer mechanisms operative,
(h) each of said predeterminer mechanisms comprising a shaft corresponding to each variator,
(i) a presettable element, including trip means, rotatably mounted on each shaft, to position said trip means in any one of a number of successively adjacent stations which are spaced at predetermined distances from each other about said shaft, releasable means for connecting each element for rotation with its shaft to hold the trip means positioned at a station,
(j) a follower for each trip means, disposed at a predetermined point in the path of the trip means,
(k) means for driving each shaft, trip means and the device of its corresponding variator in synchronism, so as to move the trip means a distance equal to the predetermined distance between the stations as said device moves from one coacting position to the next,
(l) and means including the followers of the operative predeterminer mechanism coacting with said trip means thereof, to stop said shafts when said trip means arrive at said predetermined points in their respective paths.

20. The structure defined by claim 19 wherein said means for driving said shafts and devices includes intermittent transfer means for actuating the devices and the shafts corresponding thereto in a predetermined, stepwise order and wherein all of the trip means and followers of the operative predeterminer mechanisms coact simultaneously to stop all of said shafts.

21. The structure defined by claim 20 which includes a motor for driving said shafts and their corresponding devices, the operative predeterminer mechanism including a stop switch which is closed to energize the motor, means, including the followers of said mechanism, for holding said switch closed, said means being responsive to simultaneous coaction of all of said trip means and followers of said mechanism for opening said switch.

22. The structure defined by claim 20 wherein said means for driving said shafts and devices comprises a motor which is operable in either of two directions, a reversing device for reversing the direction of operation of said motor,
   (a) said settable means including selector means operable from an initial station, through a number of intermediate stations to a final station to render a different predeterminer mechanism operative at each station, said mechanisms being preset, in the order of succession of said stations, to preselect successively greater ratios of said variationg means, said selector means being also operable in either direction from any intermediate station to another station, friction means connecting said selector means with said reversing device to condition said motor for operation in a direction corresponding to the direction of movement of said selector means.

23. The structure defined by claim 22 wherein said motor is a reversible electric motor and said reversing device is a reversible switch.

24. The structure defined by claim 19 which includes indicating means movable in synchronism with said devices for indicating the total of the values of the gear trains which are rendered effective by said devices.

25. The structure defined by claim 19 wherein said variators constitute low, intermediate and high order variators, and said means for driving the devices and shafts of said respective variators comprises
   (a) means for driving the device and shaft of the low order variator in synchronism in either of two directions,
   (b) transfer mechanisms connecting the device of each lower order variator to drive the device of the next higher order variator to an adjacent coacting position each time the device of the lower order variator completes a passage through all of its coacting positions,
   (c) the followers for the presettable means of said high, intermediate and low order shafts associated with the corresponding order variator each being movable between an initial position in which it is prevented from coacting with its associated trip means and a position in which it coacts with such trip means,
   (d) each presettable means including means for holding the corresponding follower in its initial position except at the station occupied by said trip means,
   (e) interlocking means for each adjacent pair of followers for preventing the follower of the lower order shaft from moving to coacting position with its trip means until that of said next higher order shaft has moved to coacting position,
   (f) and stop means operable by said lowest order follower to stop said driving means when said follower moves to its coacting position.

References Cited by the Examiner

UNITED STATES PATENTS 2,323,374   7/1943   Bugg _____ 74—681

DON A. WAITE, *Primary Examiner.*